United States Patent [19]

Hammett et al.

[11] 4,136,744
[45] Jan. 30, 1979

[54] GROUND DRIVEN POWER TILLAGE DEVICE

[75] Inventors: Daniel E. Hammett, Nicholasville; Edward M. Smith, Lexington, both of Ky.

[73] Assignee: The University of Kentucky Research Foundation, Lexington, Ky.

[21] Appl. No.: 815,219

[22] Filed: Jul. 12, 1977

[51] Int. Cl.² ................ A01B 33/02; A01B 33/08
[52] U.S. Cl. .................... 172/60; 172/69; 172/77; 172/78; 172/105; 172/106; 172/120; 172/125
[58] Field of Search .............. 172/15, 48, 16, 57, 172/69, 60, 105, 76, 106, 77, 120, 78, 125, 604, 657, 624

[56] References Cited

U.S. PATENT DOCUMENTS

| 176,897 | 5/1876 | Stone | 172/120 |
| 461,133 | 10/1891 | Smith | 172/69 |
| 593,908 | 11/1897 | Richter | 172/69 X |
| 994,707 | 6/1911 | Meissner | 172/120 X |
| 1,630,415 | 5/1927 | Blume et al. | 172/69 X |
| 1,795,620 | 3/1931 | Skinner | 172/69 X |
| 2,771,828 | 11/1956 | Troeng et al. | 172/105 X |
| 4,043,404 | 8/1977 | Sorlie et al. | 172/120 X |

FOREIGN PATENT DOCUMENTS 218286 11/1961 Austria ................. 172/120

Primary Examiner—Paul E. Shapiro
Attorney, Agent, or Firm—Birch, Stewart, Kolasch and Birch

[57] ABSTRACT

A power tillage device is provided having a passive rolling coulter as the prime mover for a power tillage blade which is carried in the lead of the coulter on a transfer case mounted as a radius arm on the counter shaft. The tillage blade rotates in the opposite direction from the coulter and is designed for optimum efficiency for shearing and lifting soil from a furrow.

23 Claims, 8 Drawing Figures

GROUND DRIVEN POWER TILLAGE DEVICE

FIELD OF THE INVENTION

This invention relates to tillage devices and more particularly to power driven tillage blades utilizing a passive rolling coulter or disk as a power source from which to drive the power tillage blade.

BACKGROUND OF THE INVENTION

This invention relates to "no-till" row crop planter devices and more particularly to tilling blades and tilling blade drive means therefore in which passive rolling coulter or wheels are utilized as the power source for the tilling blade The "no-till" style of planting is utilized where the soil itself has not been tilled prior to a planting operation and where individual furrows cut to a depth for receiving seeds are to be made in fields and on ground surfaces which have not been tilled previously by plowing or discing.

There are prior art "no-till" planters which employ a passive rolling coulter as the tillage device. A passive rolling coulter is totally dependent upon weight to obtain penetration into the soil snd consequently, such "no-till" planters have to be heavier than conventional planters. Passive rolling coulters provide practically no relative motion between the coulters and the soil and as a result, the coulter presses a furrow into the soil as it rolls along. Some relative motion (cutting action) between the soil and the passive rolling coulter can be obtained by shaping flutes around the periphery of the coulter. However, the fluted passive coulter requires even more weight to obtain penetration into the soil.

Power tillage allows the designer of the tillage equipment to control the relative motion between the cutting edges on the tillage blade and the soil. The power tillage blade is a tillage device which cuts (shears) layers of soil and lifts and pulverizes these layers of soil to make a furrow of some predetermined depth to receive seeds. The lifted and pulverized soil can be used to cover the seeds. The shearing and lifting action of the power tillage blade greatly reduces the weight necessary to obtain penetration as compared to the passive rolling coulter which depends totally upon weight to obtain penetration.

The power tillage concept has been developed on the premise that power can be derived from some prime mover such as a tractor which will both propel the machine and furnish power to drive the power tillage blade or blades. This, however, is one of the greatest problems encountered in making the power tillage blade compatible with row planting since each tillage blade needs to be independently suspended and independently driven in order that each blade can follow the unevenness of the soil beneath it. Mechanical drive trains, electrical motors and hydraulic motors have been tested and will function satisfactorily. All of these methods, however, experience the disadvantages of expense and power losses in making the transfer from the prime mover into the tillage blade.

A mechanism which uses a passive coulter to provide the power to drive a power tillage blade, if sufficient torque can be developed, would solve the problems attendant to the foregoing disadvantages of power loss and relatively high cost. Such a mechanism could make the power tillage system adaptable to all known "no-till" planting operations and could allow "no-till" planting to be used with crops and in areas where it can not presently be used because of inadequate pre-tillage devices.

Accordingly, it is an object of the present invention to provide a new and novel power tillage blade and passive rolling coulter combination in which the passive rolling coulter is the prime mover for the power tillage blade.

Still another object of the present invention is to provide a novel passive prime mover and power tillage blade combination which optimizes the relative velocity of the power tillage blade with respect to the soil while minimizing the speed of rotation of that blade.

These and other objects of the present invention will become more fully apparent with reference to the following specification and drawings which relate to a preferred embodiment of the present invention.

SUMMARY OF THE INVENTION

A rolling coulter is provided which is propelled by a machine such as a tractor or the like to which the device is attached and the torque developed by the coulter as it rolls is transferred by gears and/or chains in a torque transfer unit to a power tillage blade. The depth of tillage is controlled by a ground engaging depth band which floats the power tillage blade about the shaft of the coulter on a predetermined radius therefrom. A suitable frame attaches the combined coulter and power tillage blade device to a host machine such that the entire device can float up and down to follow uneven soil surfaces as the host machine is propelled over a field to be tilled. A spring can be attached to the frame to react with the frame of the host machine and provide downward pressure to enhance the contact of the rolling coulter with the ground surface.

The power tillage blade precedes the rolling coulter in a preferred embodiment of the present invention and is prevented from rotating downward beyond a certain distance by a pair of torque limit rods which are in tension under normal loads and in tension during a stalled condition of the coulter by virtue of the direction of stall torque.

The tillage blade rotates in a reverse direction or direction opposite to the direction of rotation of the passive rolling coulter such that the cutting edge on the power tillage blade will enter the soil with a horizontal velocity greater than the ground speed of the coulter, thereby providing a cutting and tilling action as opposed to rolling and pressing in the formation of the furrow in which seed is to be planted. The angular velocity of the power tillage blade when rotated in this direction is much lower than when the blade is rotated in the opposite direction and in the case of a 12 inch blade an angular velocity of 126 r.p.m.s at 4½ miles per hour ground speed by virtue of the present invention is the equivalent of a similar blade turning in the opposite direction at 630 r.p.m.s, i.e. 5 times as great an angular velocity. Accordingly, blade wear and unnecessary power requirements are both materially reduced by the present invention.

DETAILED DESCRIPTION OF THE DRAWINGS

Figure 1:
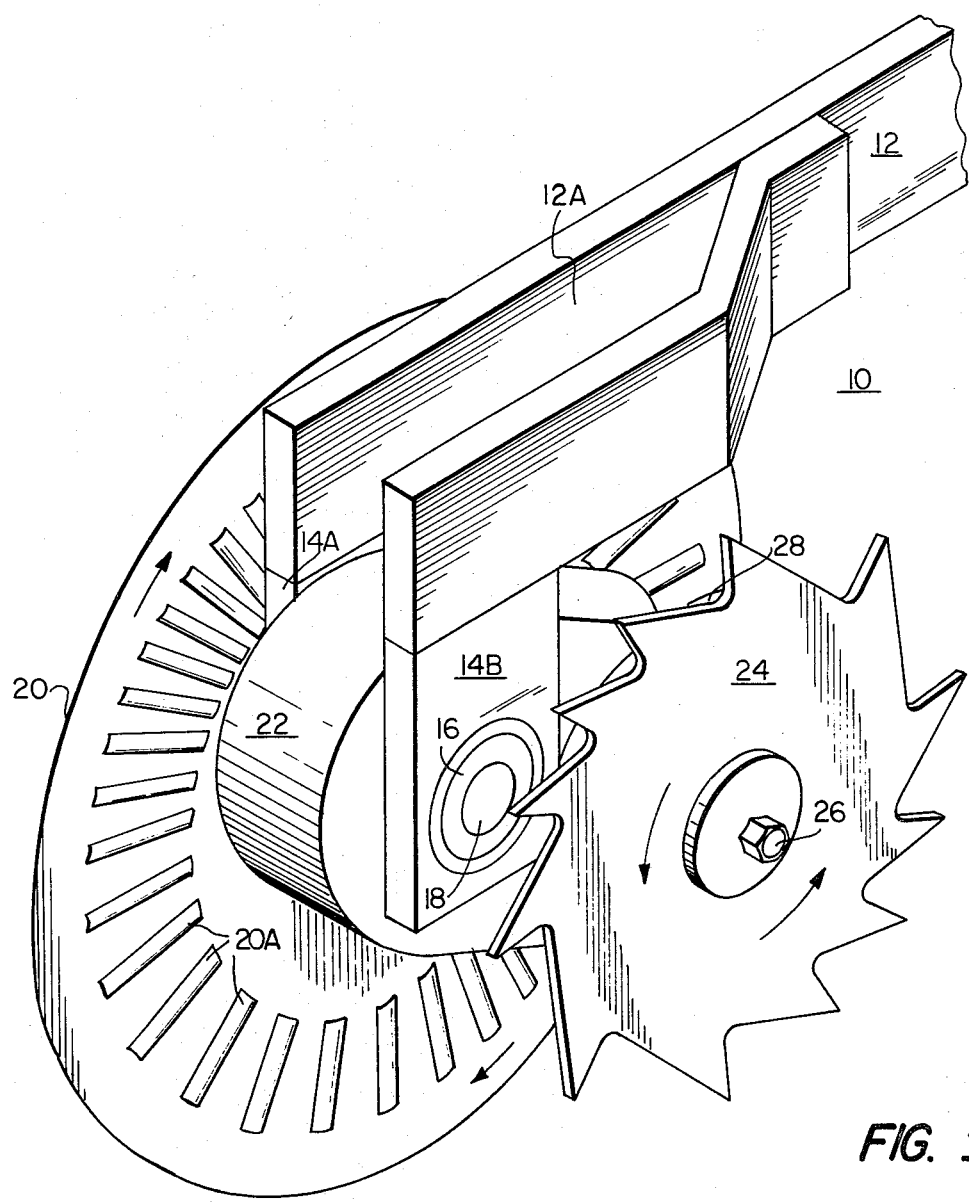
FIG. 1 is a perspective of a single tilling blade and passive drive coulter of the present invention.

Referring in detail to the drawings and with particular reference first to FIG. 1, the ground driven power tillage module 10 of the present invention is shown as including a dray bar 12 having a bifurcated end fork portion 12A, and the latter having dependent standards 14A and 14B supporting in opposed journal bearings 16, a coulter shaft 18 on which is mounted a coulter 20 at one side of the shaft 18 outboard of the left hand standard 14A of FIG. 1. The coulter 20 is provided with radially disposed and axially extending traction flutes 20A.

Figure 2:
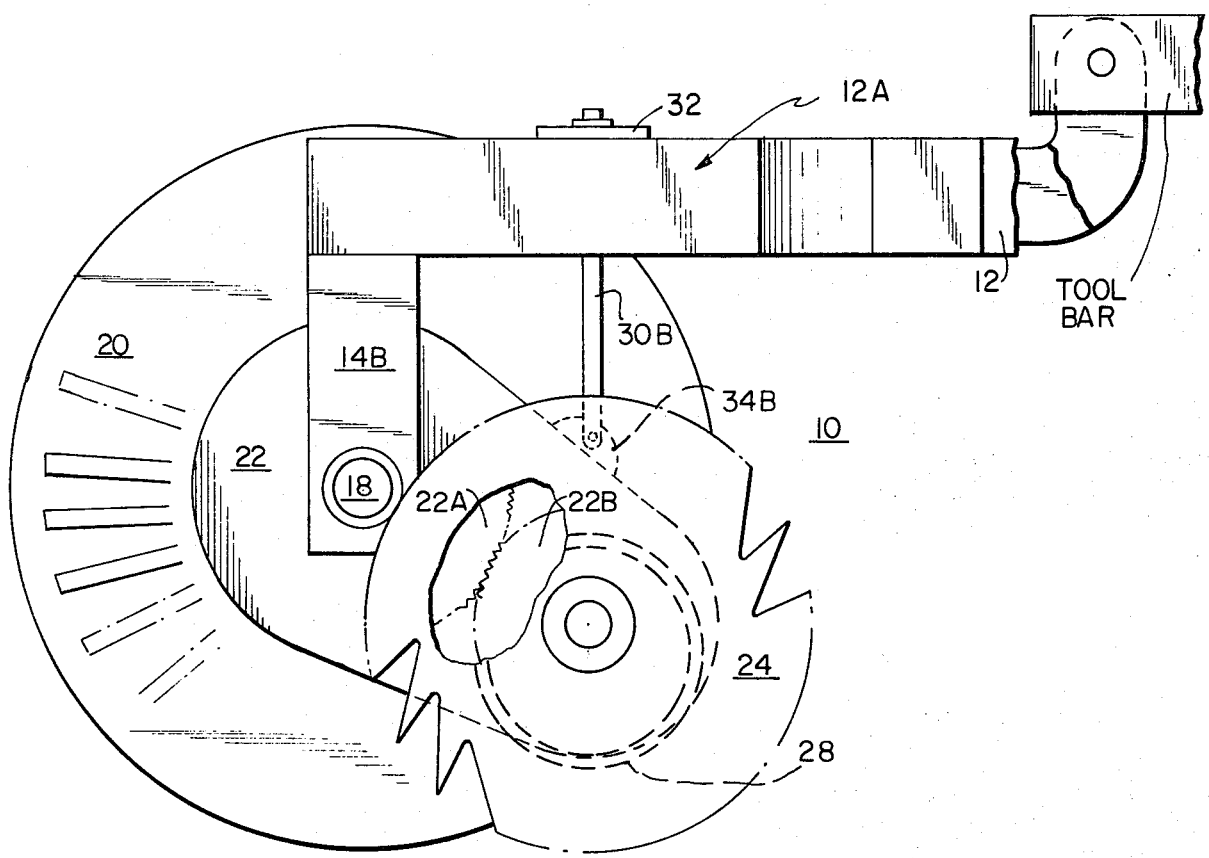
FIG. 2 is a schematic side elevation of the assembly of FIG. 1.

The coulter shaft 18 extends through both sides of a torque transfer case 22 which is schematically illustrated in FIG. 2 as including a driving or input gear 22A and a driven output gear 22B.

The driven or drawn direction of the ground driven tillage module 10 is to the right in FIGS. 1 and 2, as shown, such that a power tillage blade 24 mounted on a power blade shaft 26 extending into the forward end of the torque transfer case 22 and driven by the output gear 22B is carried in advance of the coulter or ground drive wheel 20 of the present invention by the elongated torque radius arm provided by the transfer case 22.

Figure 3:
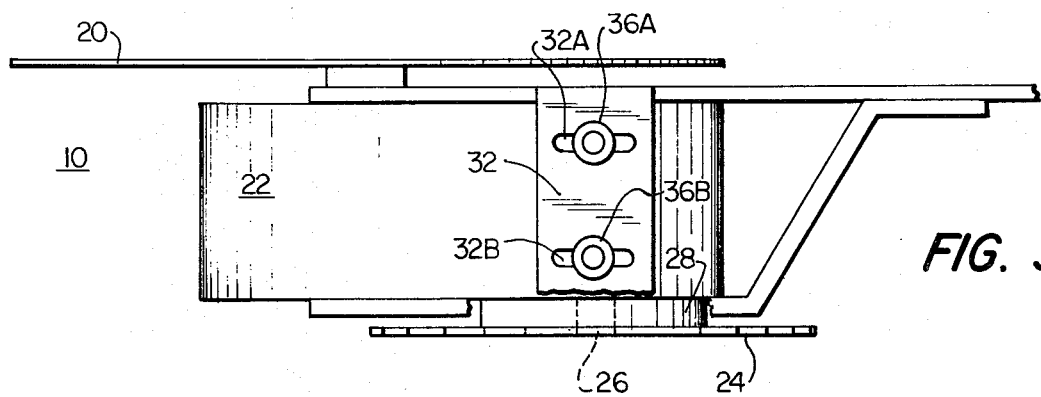
FIG. 3 is a top plan view of the schematic of FIG. 2.
Figure 4:
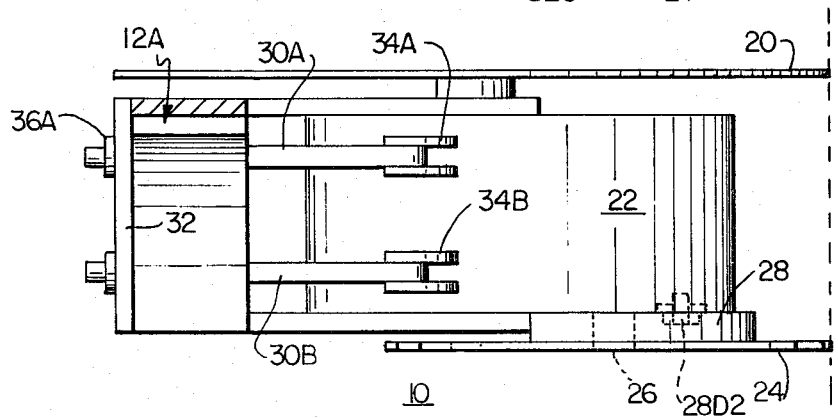
FIG. 4 is an end view of the schematic of FIG. 3.

Referring additionally to FIGS. 2, 3 and 4 in conjunction with FIG. 1, the basic assembly of the power driven tillage module 10 is completed by the inclusion of a depth band 28 which is circumferentially disposed about the power blade shaft 26 intermediate the power blade and the transfer case 22 and which is bolted to the transfer case 22 as schematically illustrated in FIG. 4 and as will be hereinafter more fully described with reference to FIG. 7 to provide vertical adjustability with respect to the ground surface which is being acted upon by the power tillage blade 24.

In a preferred embodiment of the present invention there is illustrated in FIGS. 2, 3 and 4 a pair of torque limit rods 30A and 30B mounted at one end thereof forward of and inboard of, respectively, the vertical standards 14A and 14B on a bridge member 32, which extends across and is welded to the bifurcated portion of the dray bar 12 and then the said torque limit rods extend downward to a pair of fixed pivotal connections 34A and 34B respectively, on the uppermost surface of the torque transfer case 22. Adjustable mounting bolts 36A and 36B, respectively, are provided at the uppermost ends of the torque limit rods 30A and 30B and engage the upper surface of the bridge member 32 which is provided with slots 32A and 32B to permit fore and aft play to the uppermost ends of the torque limit rods 30A and 30B therein.

Direction of Rotation of the Power Tillage Blade

As previously defined herein, the power tillage blade 24 rotates in a direction opposite to the direction of rotation of the passive rolling coulter. The opposite direction of rotation gives a higher velocity of each cutting edge on the blade 24 relative to the soil at a lower angular velocity of the blade than when the blade is rotated in the same direction as the passive rolling coulter 20. The opposite direction of rotation also accelerates each cutting edge in an upward direction as it moves through the soil and lifts the soil out of the furrow that is being cut into the soil as illustrated for the blades 24A and 24B in FIGS. 5 and 6. If the blade 24 (24A and 24B) were rotated in the same direction as the passive rolling coulter 20, each cutting edge would accelerate downward and tend to compress the soil toward the bottom of the furrow.

A cutting edge on the periphery of a round (circular) blade has a tangential velocity equal to the circumference of a circle through all cutting edges on the blade multiplied by the angular velocity of the blade about its center of rotation. The horizontal and vertical components of this tangential velocity are constantly changing relative to the soil and these accelerations relative to the soil provide the cutting force or action to till the soil. The horizontal component of the velocity relative to the soil is as follows:

$$V_h = V_c \pm V_t \cos \alpha \tag{1}$$

where:

$V_h$ = Horizontal velocity of the cutting edge relative to the soil.

$V_c$ = Tangential velocity of the periphery of the passive rolling coulter. This velocity is equal to the ground speed provided the coulter does not slip relative to the soil.

$V_t$ = Tangential velocity of the cutting edge of the power tillage blade.

$\alpha$ = Angular displacement of the cutting edge of the power tillage blade measured from a point vertically beneath the center of rotation of the blade.

$\pm \approx$ If the power tillage blade rotates in a direction opposite to the direction of rotation of the passive rolling coulter, use +; and if it rotates in the same direction as the coulter, use −.

The acceleration of the cutting edge on the power tillage blade 24 (24A, 24B) in a horizontal direction relative to the soil is the rate at which the horizontal velocity is changing with respect to time.

$$A_h = dV_h/dt = \pm (V_t^2/r) \sin \alpha \tag{2}$$

where:

$A_h$ = Horizontal acceleration of the cutting edge on the power tillage blade relative to the soil.

$r$ = Radius from center of rotation to cutting edge $\pm \approx$ If the power tillage blade rotates in a direction opposite to the direction of rotation of the passive rolling coulter, use −; and if the blade rotates in the same direction as the coulter, use +.

The vertical component of velocity relative to the soil is as follows:

$$V_v = \pm V_t \sin \alpha \tag{3}$$

where:

$V_v$ = Vertical velocity of the cutting edge on the power tillage blade relative to the soil.

$\pm \approx$ If the power tillage blade rotates in a direction opposite to the direction of rotation of the passive rolling coulter, use +; and if the blade rotates in the same direction as the coulter, use −.

The acceleration of the cutting edge on the power tillage blade in a vertical direction relative to the soil is as follows:

$$A_v = dV/dt = \pm V_t^2/r \cos \alpha \qquad (4)$$

where:
- $A_v$ = Vertical acceleration of the cutting edge on the power tillage blade relative to the soil.
- $r$ = Radius from center of rotation to cutting edge
- $\pm \approx$ If the power tillage blade rotates in a direction opposite to the direction of rotation of the passive rolling coulter, use +; and if the blade rotates in the same direction as the coulter, use −.

Careful examination of equations (1) through (4) reveals that the cutting action of the power tillage blade 24 (24A, 24B) is much more effective when the blade is rotated in a direction opposite to the direction of rotation of the passive rolling coulter 20. The horizontal component of velocity between the cutting edge and the soil is much greater and the acceleration of the cutting edge in a vertical direction relative to the soil provides a lifting force to help in shearing (tilling) the soil. Examination of these equations also reveals that the angular velocity of the power tillage blade 24 (24A, 24B) can be much lower when the blade is rotated opposite to the direction of rotation of the passive rolling coulter 20. For example, if one operates a power tillage blade which is 12 inches in diameter at a ground speed of 4.5 miles per hour, an angular velocity of 126 r.p.m. in a direction opposite to the rolling coulter and at a tillage depth of 3 inches, each cutting edge on the power tillage blade will enter the soil with a horizontal velocity relative to the soil of:

$$V_h = V_c \pm V_t \cos \alpha \qquad (1)$$

where:
- $V_c$ = 4.5 mi/hr
- $V_t$ = 4.5 mi/hr
- $\alpha$ = 0°
- $V_h$ = 4.5 + 4.5 = 9 mi/hr Each cutting edge of the power tillage blade would leave the soil with a horizontal velocity of:

$$V_h = 4.5 + 4.5 \cos(60°) = 6.75 \text{ mi/hr}.$$

In contrast, if the power tillage blade was rotated in the same direction as the rolling coulter and each cutting edge entered the soil with a horizontal velocity of 6.75 miles per hour, the angular velocity of the power tillage blade would have to be 630 r.p.m., i.e., 5 times as great as the angular velocity when the blade is rotated opposite to the direction of the rolling coulter. The lower angular velocity is quite significant in reducing wear on the cutting edges of the power tillage blade.

Another advantage of rotating the power tillage blade 24 (24A, 24B) in a direction opposite to the rotation of the rolling coulter 20 is that the torque delivered by the coulter opposes the torque required by the power tillage blade. In effect the units are locked by opposing forces so that if the rolling coulter 20 stalls and slips in the soil, the power tillage blade 24 (24A, 24B) will continue to till the soil much like a rigid shank tillage tool. On the other hand, if the power tillage blade was rotated in the same direction as the rolling coulter, stall and slip of the coulter would allow the power tillage blade to roll and not till the soil.

Relative Diameters of Coulter and Power Tillage Blade

The passive rolling coulter 20 should be larger than the power tillage blade 24 (24A, 24B) to afford a mechanical advantage in the transfer of torque from the coulter to the power tillage blade. The ratio of the diameter of the rolling coulter divided by the diameter of the power tillage blade should be 1.5 to 2.0, i.e., the diameter of the passive rolling coulter should be from 1.5 to 2 times the diameter of the power tillage blade.

Velocity Ratio Between Coulter and Power Tillage Blade

The power tillage blade 24 (24A, 24B) should be operated between 0.5 and 2.0 times the free roll velocity of the blade. Free roll velocity is when the magnitude of the tangential velocity of the power tillage blade is equal to the tangential velocity of the passive rolling coulter. The velocity ratio between the passive rolling coulter and the power tillage blade is as follows:

$$V_r = D_b/D_c \times r \qquad (5)$$

where:
- $V_r$ = Velocity ratio between the passive rolling coulter and the power tillage blade, i.e., the number of revolutions of the passive rolling coulter for each revolution of the power tillage blade.
- $D_b$ = Diameter of the power tillage blade.
- $D_c$ = Diameter of the passive rolling coulter.
- $r$ = Desired ratio of angular velocity of the power tillage blade to its free roll angular velocity.

For example, if the power tillage blade is to operate at free roll velocity, r = 1, the diameter of the power tillage blade is 12 inches, and the diameter of the passive rolling coulter is 19 inches, the velocity ratio between the coulter and tillage blade should be:

$$V_r = 12/(19 \times 1) = 0.63$$

i.e., the passive rolling coulter 20 should rotate 0.63 revolutions for each revolution of the power tillage blade 24 (24A, 24B). This ratio also gives the torque multiplication factor, i.e., 63% of the torque developed by the passive rolling coulter is transferred to the power tillage blade.

Lead Position of the Power Tillage Blade

The power tillage blade 24 (24A, 24B) has its center of rotation leading (ahead of) the shaft 18 that it receives power from (via drive gear 22A) and should be able to rotate about this power shaft 18 so that the blade can move up and down to follow uneven soil surfaces. Positioning the power tillage blade 24 (24A, 24B) ahead of its power shaft 18 allows the torque being transferred from the coulter 20 to the said tillage blade (via gears 22A, 22B) to supply a downward force to push the said tillage blade into the soil. If the power tillage blade trails or follows behind the shaft that it receives power from, the torque would supply a force to lift the power tillage blade out of the soil.

The Torque Limit Rods

The torque limit rods 30A and 30B are used to limit the downward travel of the power tillage blade 24 (24A, 24B) due to the torque being transferred from the coulter 20 through the transfer case 22. These rods 30A and 30B apply a downward force on the bridge member 32 (via pivots 34A, 34B) and when the coulter 20 tends to stall, the torque limit rods apply a downward force on the coulter 20 to give it more traction in the soil. The torque limit rods act to reduce the amount of weight which is normally required to make a passive rolling coulter penetrate the soil and function properly. The torque limit rods can also be used for depth control in some instances. Springs can be used on the torque limit rods to control the rate of up and down movement of the power tillage blade and to cushion the shock load when the rods are suddenly extended or contracted during operation over a rough field surface.

The Depth Band

The circular depth band 28 is mounted adjacent to the power tillage blade 24 (24A, 24B), but not attached thereto. The band 28 is located so that its center is vertically in line with the center of rotation of the power tillage blade 24 (24A, 24B). The depth band should be attached so that it can be adjusted up and down to obtain a desired depth of tillage. The diameter of the circular depth band is preferably no less than one-half the diameter of the power tillage blade.

A free rolling wheel can be used as a depth gauge instead of a circular depth band. Such a wheel would be mounted so that its center of rotation is vertically in line with the center of rotation of the power tillage blade. The wheel would be mounted in such a manner as to maintain this alignment as it is adjusted up and down to obtain a desired depth of tillage.

Figure 7:
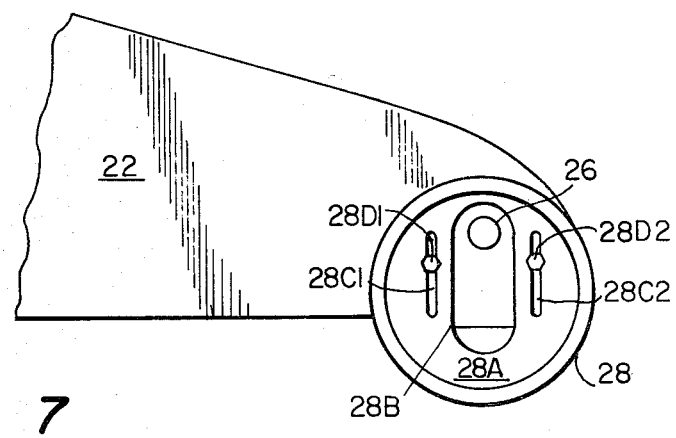
FIG. 7 is an illustration of a preferred form of depth band structure for controlling the furrow depth of the power tillage blade of the present invention.

Referring to FIG. 7, the depth band is shown as an annular flange about the periphery of a mounting plate 28A having formed therein a central and vertically elongated central aperture 28B surrounding the tillage blade shaft 26 and first and second vertically oriented adjustment slots 28C1 and 28C2 on either side of the central aperture 28B which cooperate with bolts 28D1 and 28D2, respectively, to adjust the relative vertical position of the depth band 28 and the tillage blade shaft 26.

Tooth Shape and Number of Teeth on the Power Tillage Blade

Figure 5:
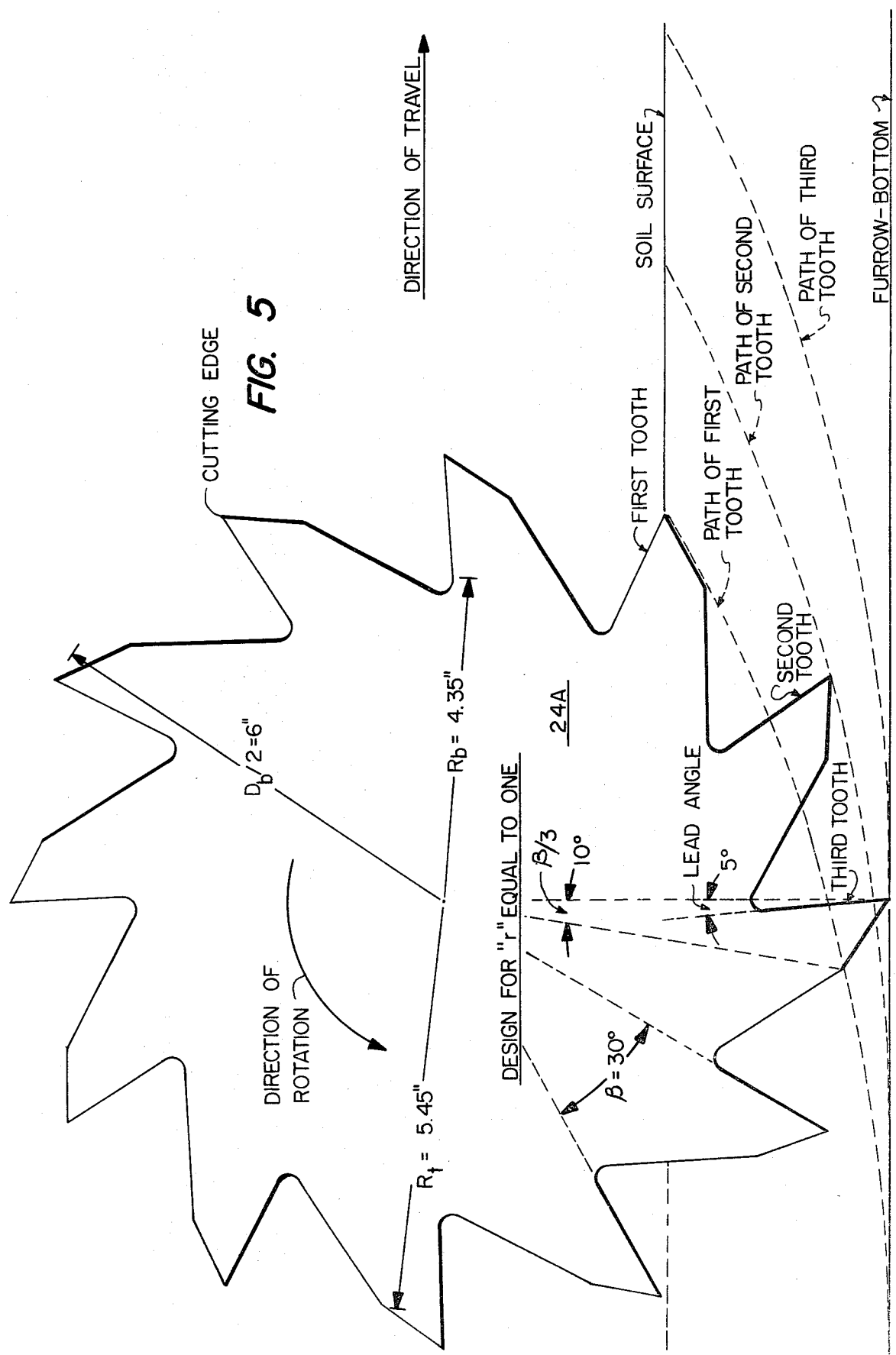
FIG. 5 is a first embodiment of a power tillage blade of the present invention.
Figure 6:
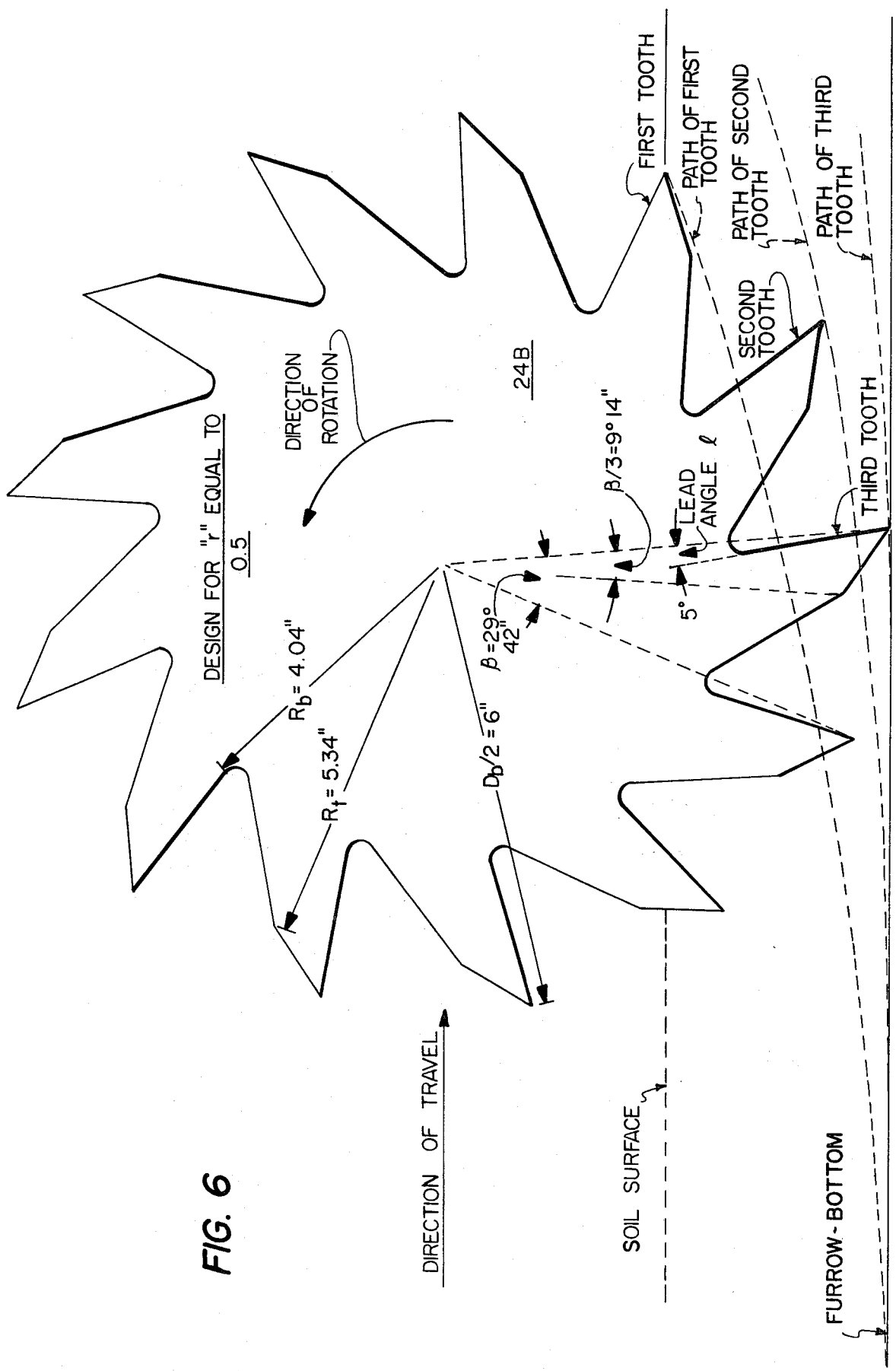
FIG. 6 is a second embodiment of a power tillage blade of the present invention.

The path followed by a cutting edge on the power tillage blade 24 (24A, 24B) as it moves through the soil depends upon the ratio of the angular velocity of the blade divided by the free roll angular velocity of the blade and the diameter of the blade. The preferred embodiments 24A and 24B of the tillage blades of the present invention are illustrated in FIGS. 5 and 6 which are now referred to in conjunction with the following parametric equations defining the path followed by a cutting edge as it moves through the soil:

$$X = \frac{D_b}{2}[\frac{\alpha}{57.3r} + \sin(\alpha)] \quad (6)$$

$$Y = \frac{-D_b}{2}[\cos(\alpha) - 1] \quad (7)$$

where:
$X$ = Horizontal displacement of a cutting edge on the power tillage blade from a position vertically beneath the center of rotation of the blade (inches)
$Y$ = Vertical displacement of a cutting edge on the power tillage blade from a position vertically beneath the center of rotation of the blade (inches).

$D_b$ = Diameter of the power tillage blade (inches).
$r$ = Ratio of the angular velocity of the power tillage blade divided by the free roll angular velocity of the blade.

Succeeding cutting edges will follow the same shape path and will enter the soil ($\alpha = 0$) after the center of rotation of the blade has moved a horizontal distance equal to:

$$X_1 = \frac{D_b}{2}[\frac{\beta}{57.3r}] \quad (8)$$

where:
$\beta$ = Angular displacement of cutting edges around the periphery of the power tillage blade (degrees). The angle $\beta$ is related to the number of cutting edges around the periphery of the blade:

$$\beta = 360°/N \quad (9)$$

where:
$N$ = Number of cutting edges on the power tillage blade.

Each cutting edge on the power tillage blade is so shaped as to be able to follow its path through the soil without interference from other parts of the blade. Adequate clearance angles are thus provided on the leading and trailing faces of each cutting edge.

The leading face from each cutting edge preferably form an angle of 5° ± $l$ ± 20° with a radial line from the center of rotation of the blade to the cutting edge. This leading face should be behind the radial line and extend from the cutting edge to a base circle whose radius from the center of rotation of the blade is as follows:

$$R_b{}^* = \frac{\frac{D_b}{2}\left[\frac{\phi - \beta}{57.3r} + \sin(\phi)\right]}{\left[\frac{\phi}{57.3r} + \sin(\phi)\right]} \quad (10)$$

where:
$R_b$ = Radius of a base circle from which the cutting teeth on a power tillage blade should be formed (inches).
$\phi$ = Angular displacement of a cutting edge for a given depth of tillage (degrees).

$$\phi = \cos^{-1} 2d/D_b \quad (11)$$

$d$ = Tillage depth (inches)
(* If $R_b < (D_b/3)$ more teeth should be added to the periphery of the blade so that the base of each tooth will be strong enough to resist the bending moment on the tooth due to transverse forces from the soil).

The trailing face from each cutting edge should extend from the cutting edge to the heel of the trailing face. The heel of the trailing face should be located on a radical line which forms an angle of ($\beta/3$) with the radial line to the cutting edge. The radius to the heel of the trailing face is as follows:

$$R_t = \frac{\frac{D_b}{2}\left[\frac{\phi - (\beta/3)}{57.3r} + \sin(\phi)\right]}{\left[\frac{\phi}{57.3r} + \sin(\phi)\right]} \quad (12)$$

where:

$R_t$ = Radius to the heel of the trailing face of the cutting edge on a power tillage blade (inches).

The tooth shape is completed by constructing an arc, whose radius is 3/16 of an inch, tangent to the leading face of the adjacent tooth at the point where the leading face intersects with the base circle and extending a line from the heel of the trailing face to a point where this line is tangent to the arc. The blade material is removed between the leading face of each tooth and the trailing face and the line which connects the heel to the arc on the adjacent tooth.

The blade thickness should be, 3/16 inch ≦ blade thickness ≦ ½ inch, however, the width of the cutting edge on each tooth can be equal to the desired width of the tilled furrow.

Operation

Once the dray bar 12 is attached to a host machine such as a tractor or the like, the pulling of the tillage module 10 from left to right as illustrated in the drawings will cause coulter 20 and the flutes 20A thereon to engage the ground and rotate the coulter shaft 18 drive gear 22A and driven gear 22B to impart rotation opposite to that of the coulter 20 to the power tillage blade 24 through the blade shaft 26.

The torque rods 30A and 30B on the transfer case 22 constrain the tillage blade which tends to place the torque rods 30A and 30B in tension between the hinging bracket 32 and the pivots 34A, 34B on the transfer case 22.

In the event that the coulter 20 stalls during rotation, the stall torque constrains the radius arm comprising the transfer case 22 closkwise about the coulter shaft 18, in the orientation shown in the drawings so that the torque rods 30A and 30B are in tension and the tillage wheel 24, even though not turning, will continue to till a furrow in the manner of a conventional harrow tooth or the like.

Thus, suitable spring bias means axially of this torque rods 30A and 30B would enhance the ground following capabilities of the tillage blade 24 and can be utilized if desired.

The lowermost periphery of the depth band 28 slides along the surface of the ground being tilled to control the maximum depth of the furrow being cut by the tillage blade 24.

Gang Tillage Embodiment

Figure 8:
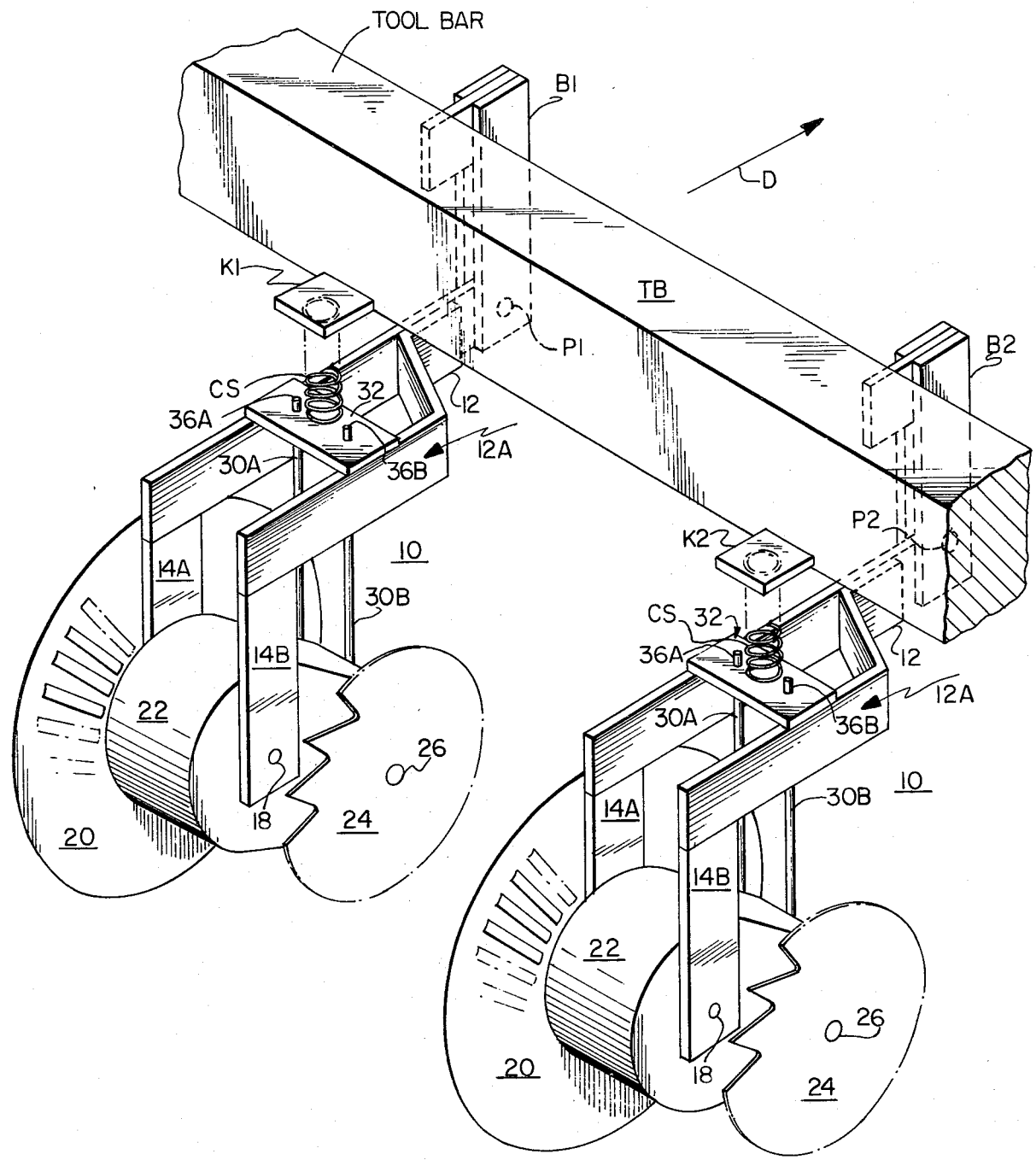
FIG. 8 is a perspective of a multiple or gang embodiment of the power tillage devices of the present invention.

Referring to FIG. 8 of the drawings, a gang configuration for the power tillage module 10 of the present invention is shown as including a tractor or host machine tool bar TB having integral brackets B1 and B2 having dependent bifurcated portions terminating in pivots P1 and P2 respectively for receiving the forward end of the tool bars or dray bar 12 of the power tillage module 10.

Thus, the dray bars 12 extend beneath the tool bar TB of a tractor or host machine and the coulter 20 and tillage blade 24 and torque transfer case 22 and the remaining portions of the structure all trail behind the tool bar of the host machine which moves in the direction shown by the arrow D.

Extending from the lowermost trailing edge of the tool bar TB are first and second spring keepers K1 and K2 which comprise flat rectangular plates welded or otherwise affixed to the tool bar TB for supporting and constraining in place, a compression spring CS which extends downward into abutting relationship with the uppermost surface of the bridging bracket 32 on the bifurcated portion 12A of the dray bars 12 of the power tillage module 10.

The action of the spring CS between the tool bar extension or spring keepers K1, K2 and the bridging brackets 32 forces the coulters 20 down into the ground to the required extent to provide the necessary traction and torque for effective driving of the power tillage blades 24.

The tool bar TB may be quite extensive in length so as to support a plurality of modules 10 such as, for example, 12 whereby 12 furrows may be cut and seeded or otherwise treated simultaneously with the only motive power device being that of the host machine itself and the prime moving of each tillage blade 24 being accomplished by the passive rolling coulters 20 and torque transfer devices 22.

It should be understood that the power tillage device of the present invention may be modified as would occur to one of ordinary skill in the art without departing from the spirit and scope of the present invention.

It is claimed:

1. A power tillage module comprising:
   a dray bar having a coupling end and a free end;
   a rotary coulter suspended beneath the free end of said dray bar for engagement with a ground surface to be tilled and rotatable by said ground engagement in response to translation of said dray bar;
   a power shaft rotatable by said coulter;
   a torque transfer means having an input drive means engaged with and driven by said power shaft in response to rotation of said coulter and an output shaft means substantially parallel with and radially spaced from said power shaft and driven by said input drive means in opposite rotation to said power shaft;
   a rotary tillage blade mounted on said output shaft means for rotation therewith for engagement with and partial entry to a predetermined tilling depth into the surface of the ground to be tilled;
   said torque transfer means including a housing; and
   ground engaging depth limiting means mounted on said housing adjacent said tilling blade for maintaining said predetermined tilling depth of said tilling blade.

2. The power tillage module of claim 1, wherein said housing comprises a radius arm maintaining said output shaft means parallel to and concentrically displaceable about said power shaft; and
   wherein said tillage blade leads said power shaft in the direction of translation of said dray bar.

3. The power tillage module of claim 2, which further includes limit means extending from said dray bar to a point on said housing above said output shaft means for limiting the concentric displacement of said output shaft means about said power shaft.

4. The power tillage module of claim 3, wherein said limit means comprise:
   a pair of elongated torque rods, a bracket on said dray bar and a pair of pivot means on said housing; and
   wherein said rods are slidably mounted at one end thereof in said bracket and pivotally connected at the other ends thereof to respective ones of said pair of pivot means.

5. The power tillage module of claim 1, wherein the diameter of said coulter is on the order of 1.5 to 2.0 times the diameter of said tillage blade.

6. The power tillage module of claim 1, wherein said tillage blade is rotated at a velocity in the range of 0.5 to 2.0 times the free roll velocity of said tillage blade.

7. The power tillage module of claim 1, wherein the diameter of said coulter is on the order of 1.5 to 2.0 times the diameter of said tillage blade; and
wherein said tillage blade is rotated at a velocity in the range of 0.5 to 2.0 times the free roll velocity of said tillage blade.

8. The power tillage module of claim 1, wherein said housing comprises a radius arm maintaining said output shaft means parallel to and concentrically displaceable about said power shaft; and
wherein said tillage blade leads said power shaft in the direction of translation of said dray bar;
said coulter having a diameter on the order of 1.5 to 2.0 times the diameter of said tillage blade.

9. The power tillage module of claim 1, wherein said housing comprises a radius arm maintaining said output shaft means parallel to and concentrically displaceable about said power shaft; and
wherein said tillage blade leads said power shaft in the direction of translation of said dray bar;
said tillage blade being rotated at a velocity in the range of 0.5 to 2.0 times the free roll velocity of said tillage blade.

10. The power tillage module of claim 9, wherein the diameter of said coulter is on the order of 1.5 to 2.0 times the diameter of said tillage blade.

11. In the furrow forming tillage device including a dray bar for connection with and translation by a host machine, the improvement comprising:
a passive rolling coulter driven in rotation in response to translation of said dray bar;
a power shaft driven by said coulter;
a tillage blade driven by said power shaft in the opposite direction of rotation and in a leading ground engaging position with respect thereto for cutting a said furrow; and
the diameter of said coulter being on the order of 1.5 to 2.0 times the diameter of said tillage blade.

12. In the furrow forming tillage device including a dray bar for connection with and translation by a host machine, the improvement comprising:
a passive rolling coulter driven in rotation in response to translation of said dray bar;
a power shaft driven by said coulter;
a tillage blade driven by said power shaft in the opposite direction of rotation and in a leading ground engaging position with respect thereto for cutting a said furrow; and
said tillage blade is rotated at a velocity in the range of 0.5 to 2.0 times the free roll velocity of said tillage blade.

13. In the furrow forming tillage device including a dray bar for connection with and translation by a host machine, the improvement comprising:
a passive rolling coulter driven in rotation in response to translation of said dray bar;
a power shaft driven by said coulter;
a tillage blade driven by said power shaft in the opposite direction of rotation and in a leading ground engaging position with respect thereto for cutting a said furrow;
the diameter of said coulter being on the order of 1.5 to 2.0 times the diameter of said tillage blade; and
wherein said tillage blade is rotated at a velocity in the range of 0.5 to 2.0 times the free roll velocity of said tillage blade.

14. A gang tillage device for towing from a host machine with individual, passive prime movers for each tillage means therein comprising:
a tool bar;
bracket means on said tool bar having pivot connections beneath said tool bar;
a plurality of power tillage modules each having a dray bar with a free end and a coupling end, the coupling end being attached to a corresponding said pivot means on said bracket means;
each said power tillage module further comprising:
a rotary coulter suspended beneath the free end of said dray bar for engagement with a ground surface to be tilled and rotatable by said ground engagement in response to translation of said dray bar;
a power shaft rotatable by said coulter;
a torque transfer means having an input drive means engaged with and driven by said power shaft in response to rotation of said coulter and an output shaft means substantially parallel with and radially spaced from said power shaft and driven by said input drive means in opposite rotation to said power shaft;
a rotary tillage blade mounted on said output shaft means for rotation therewith for engagement with a partial entry to a predetermined tilling depth into the surface of the ground to be tilled;
said torque transfer means including a housing; and
ground engaging depth limiting means mounted on said housing adjacent said tilling blade for maintaining said predetermined tilling depth of said tilling blade; and
said tillage device further including bias means mounted on said tool bar and acting against said free end of said dray bar to bias said coulter toward said ground surface.

15. The power tillage device of claim 14, wherein, in each said module, said housing comprises a radius arm maintaining said output shaft means parallel to and concentrically displaceable about said power shaft; and
said tillage blade leads said power shaft in the direction of translation of said dray bar.

16. The invention of claim 15 which further includes limit means extending from said dray bar to a point on said housing above said output shaft means for limiting the concentric displacement of said output shaft means about said power shaft.

17. The invention of claim 16, wherein said limit means comprise:
a pair of elongated torque rods, a bracket on said dray bar and a pair of pivot means on said housing; and
wherein said rods are slidably mounted at one end thereof in said bracket and pivotally connected at the other ends thereof to respective ones of said pair of pivot means.

18. The power tillage device of claim 14, wherein, in each said module, the diameter of said coulter is on the order of 1.5 to 2.0 times the diameter of said tillage blade.

19. The power tillage device of claim 14, wherein, in each said module, said tillage blade is rotated at a velocity in the range of 0.5 to 2.0 times the free roll velocity of said tillage blade.

20. The power tillage device of claim 14, wherein, in each said module, the diameter of said coulter is on the order of 1.5 to 2.0 times the diameter of said tillage blade; and said tillage blade is rotated at a velocity in the range of 0.5 to 2.0 times the free roll velocity of said tillage blade.

21. The power tillage device of claim 14, wherein, in each said module, said housing comprises a radius arm maintaining said output shaft means parallel to and concentrically displaceable about said power shaft; and said tillage blade leads said power shaft in the direction of translation of said dray bar;

said coulter having a diameter on the order of 1.5 to 2.0 times the diameter of said tillage blade.

22. The power tillage device of claim 14, wherein, in each said module, said housing comprises a radius arm maintaining said output shaft means parallel to and concentrically displaceable about said power shaft; and said tillage blade leads said power shaft in the direction of translation of said dray bar;

said tillage blade being rotated at a velocity in the range of 0.5 to 2.0 times the free roll velocity of said tillage blade.

23. The power tillage device of claim 22, wherein the diameter of said coulter is on the order of 1.5 to 2.0 times the diameter of said tillage blade.

* * * * *